Figure 1:
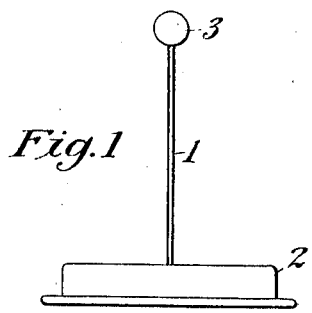

W. A. KELLY.
MOMENTUM AND INERTIA EQUALIZER.
APPLICATION FILED SEPT. 4, 1900. RENEWED OCT. 5, 1910.

992,134.

Patented May 9, 1911.

Witnesses:

Inventor:
William Ashley Kelly

UNITED STATES PATENT OFFICE.

WILLIAM ASHLEY KELLY, OF NEW YORK, N. Y.

MOMENTUM AND INERTIA EQUALIZER.

992,134. Specification of Letters Patent. Patented May 9, 1911.

Application filed September 4, 1900, Serial No. 28,870. Renewed October 5, 1910. Serial No. 585,517.

*To all whom it may concern:*

Be it known that I, WILLIAM A. KELLY, a citizen of the United States, and resident of the borough of Manhattan, city of New York, in the county of New York and State of New York, have invented certain new and useful Improvements in Momentum and Inertia Equalizers of which the following is a specification.

A well known objection to many classes of machines having reciprocating parts is the waste of power consumed in reversing these parts, and also the great strains thereby put upon the connecting rod and crank shaft (or their equivalents), causing excessive wear, heated bearings and liability to breakage. It is also well known that this defect is caused by the inertia of the reciprocating parts, and the object of the present invention is to remove the defect mentioned by equalizing the momentum and inertia of the reciprocating parts, the effect being to prevent "pounding" on the crank-pin to equalize the pressure on the crank-pin throughout a stroke, and to tend to equalize the rotative speed throughout a revolution.

As examples of machines to which the invention is applicable, but not including all, may be mentioned, mowers, reapers, grain separators, most sewing machines, steam engines when the reciprocating parts are unavoidably heavy, and bob weights employed for balancing purposes.

The invention consists, generally, in providing an isochronal vibratory spring, or similar element, which is connected up with the reciprocating part of the machine and to a relatively stationary part thereof under the proper adjustment. Means for adjustment are provided, or the machine is so built in the first place, that the period of vibration of the resilient element, when loaded with the reciprocating part, agrees in isochronism with the rate at which the said reciprocating part of the machine is arbitrarily independently driven. For example, suppose a machine part reciprocates 800 times per minute; then I provide that the said part shall have connected to it and to a relatively stationary part a resilient element which, when loaded with the reciprocating part, has a period of vibration of 800 per minute, the connection being such that the said resilient element has its point of equilibrium at the middle point of the stroke of the said reciprocating part. The result of the above arrangement is that the resilient element carries the reciprocating part as a freely vibrated load, and the connecting rod is relieved of all the intermittent strains caused by momentum and inertia of the reciprocating part acting to oppose its reversal of motion. The resilient element absorbs the momentum of the reciprocating machine part and stores the force during the movement of said part from the central point of reciprocation to the end—that is, during the latter half of a complete stroke in either direction—and this stored energy is given out again during the first half of the return stroke, overcoming the inertia of the reciprocating part of the machine. The sudden strain on the connecting rod due to reversal of motion of the machine part is thus completely relieved, and not only this useless strain removed but power is saved and perfect smoothness of running secured.

For the most perfect operation it is necessary that the resilient element should equalize, and thus eliminate, at all points in the stroke all accelerating and retarding tendencies due to momentum and inertia in the reciprocating part, otherwise the function would be less perfect on account of the equalization being uneven and irregular.

There are some reciprocating parts of machines to which the invention is not applicable, their momentum and inertia in some cases being required to equalize corresponding inequalities in the motive power or in the working resistance, and in other cases the momentum itself doing the work. As an example of the latter, percussion tools depend upon momentum for effective results. As an example of the former condition, in air compressors the pistons and connected reciprocating parts are made purposely heavy in order that their momentum may overcome the increasing back pressure of the air the farther the piston moves toward the end of its stroke and also to compensate for the decreasing steam pressure in the steam cylinder after cut off takes place.

In some machines it is advisable to equalize a portion only of the total momentum and inertia, the other portion having some useful service to perform. In the reciprocating steam engine, as the cylinder pressure, through expansion, decreases toward the last of the stroke, the accumulated momentum, to the extent necessary, is useful to equalize this irregularity in the power; but sometimes, especially in high speed engines, the reciprocating parts are unavoidably so heavy that they more than neutralize—or overbalance—the variations in the steam pressure in the cylinder, and in such cases the excess of momentum and inertia only are to be equalized by the device constituting the present invention. Also in mowing machines the heaviest work of cutting comes toward the end of the strokes of the sickle, and therefore to the extent necessary to overcome this difference momentum in the sickle is useful and only the surplus should be equalized.

More particularly, the present invention is intended, in the class of machines described, to equalize, and thus virtually eliminate, in the reciprocating parts, that amount of momentum and inertia which is useless and disturbing, which amount may be all or only a portion of the total.

Ordinarily, in practice approximately half of the mass of the connecting rod of a crank-and-pitman may be considered as belonging to the reciprocating parts, and its momentum and inertia equalized therewith, when desired.

It is to be noted that the adjusting means provided serve equally well for alterations either in the rate or the mass of the reciprocated part.

The invention is further explained by reference to the accompanying drawings.

Figure 2:
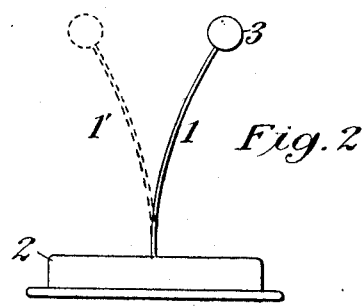
Figure 3:
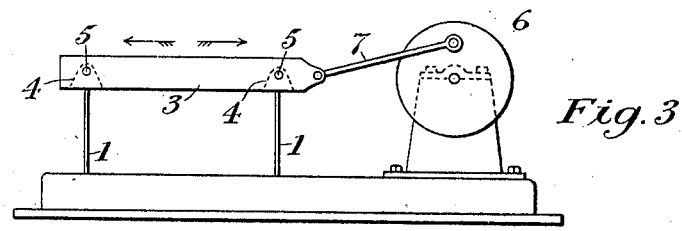
Figure 4:
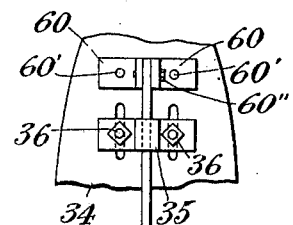
Figure 5:
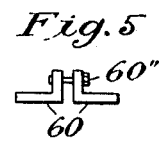
Figure 6:
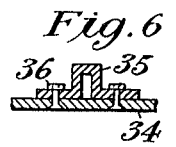

Figure 1 is an elevation of an elastic vibratory loaded reed or spring, fastened at one end and free at the other, and illustrates the principle employed. Fig. 2 shows the same device represented as vibrating. Fig. 3 is an elevation of a device which may be employed as a model of the elementary type of the invention and used to illustrate the principle of operation. Fig. 4 shows the invention in plan as applied to the sickle of a mowing machine, and shows means for adjustment. Fig. 5 is a detail of Fig. 4. Fig. 6 is another detail of Fig. 4.

In Figs. 1 and 2, 1 represents a bar spring rigidly fastened at one end to the base plate 2, the other end being free to vibrate and being provided with a load in the form of a heavy ball 3. When the bar 1 is pulled to one side, as represented in Fig. 2, it swings, when released, to the position shown dotted at 1', and continues to isochronously swing back and forth, till stopped by friction, carrying the ball 3 as a vibrated load, the number of vibrations per given length of time being determined by the elasticity of the bar 1 and the weight of the ball 3. It is seen that the ball 3 has its direction of motion reversed by the elasticity of the spring 1, the said spring absorbing and storing as elastic energy the momentum of the said ball as the ball moves from the position shown in Fig. 1 to that shown in Fig. 2, and giving out the stored energy in overcoming the inertia of the ball 3 and restoring its momentum as it moves from the position shown in Fig. 2 to that of Fig. 1. There is nothing new in this construction, these figures representing nothing more than a loaded reed, and being introduced merely to illustrate the principle made use of in the invention, the resilient element of the invention carrying and vibrating the reciprocating machine part in the same manner that the ball 3 is carried by the spring 1, the period of the resilient element and the rate of independent reciprocation of the machine part being made to synchronize with each other.

In Fig. 3 there are two springs 1, supporting at their upper extremities the part to be reciprocated 3, the same having notches, represented by the dotted lines 4, into which the springs extend, and the springs 1 are fastened to the part 3 by pins 5 which serve as pivots, but the fastening of the springs 1 is rigid at their lower ends. The part 3 is connected to the crank disk 6 by the connecting rod 7, and the part 3 is reciprocated by said crank disk and connecting rod at some constant rate. Each of the springs 1, as shown, has its point of equilibrium coinciding with the middle point of stroke given to the part 3 by the crank disk 6. The springs 1 are provided of the proper strength that their period of vibration, when they are loaded with the part 3, is the same as the rate of reciprocation independently given to the part 3 by the crank disk 6 through the connecting rod 7. With this construction, the momentum of the part 3 is absorbed and stored by the springs 1 during the last half of each stroke given the part 3 by the crank 6, and during the first half of each stroke the inertia of the said part is overcome by the springs 1 and (practically) its former momentum restored, in the opposite direction. The momentum of the part 3 is gradually reversed in direction by the springs 1 in the same manner as that of the ball 3 by the spring 1 in Figs. 1 and 2. As the direction of motion of the part 3 is reversed by the springs 1, instead of (as ordinarily) by the crank disk 6, the strain due to such reversal is removed from the connecting rod 7 and its connecting bearings and from the crank disk 6 and its bearings.

Fig. 3, just described, simply represents a model, in which 3 may be taken to represent the reciprocating part of any machine in general to which the device is applicable, the operation being in all cases the same, hence, in describing the remaining figure only the features of operation that are individually peculiar to it need be given.

Fig. 4 illustrates a practical application of the invention to the sickle of a mowing machine, with means for adjustment whereby the resilient element 33, with its load 38, is made to agree in its natural period with the rate of reciprocation independently given to the sickle 38 by the pitman 61. One end of the flat bar spring 33 is attached rigidly to the shoe of the machine 34 (shown partly broken away) by means of the clamp 60 secured to the shoe 34 by the rivets 60' and to the spring 33 by the bolt 60. An adjustable slide 35 closely embraces the spring 33 and is held in place by bolts 36 passing through slots in the shoe 34. The free end of the spring 33 terminates in a rounded portion which is received between two lugs 37 on the sickle 38. The sickle 38 is driven by the pitman 61 in the ordinary manner, being in the same manner in which, in Fig. 3, the part 3 is driven by the connecting rod 7, and the spring 33 having its position of equilibrium at the middle point of the stroke the same as the springs 1 in Fig. 3. By reason of the adjusting means provided, the sickle 38 is adapted to be reciprocated by the pitman 61 at various speeds and still have its rate of reciprocation agree with the natural period of vibration of the spring 33 loaded with the sickle 38. By moving the slide 35 to different positions along the slots in the shoe 34, the free portion of the spring 33 is lengthened or shortened and thus the vibrational period can be changed to agree with the independent rate of reciprocation. The spring 33, in carrying the sickle 38 as a vibrated load, absorbs and restores its momentum in the same manner as described in connection with Fig. 3, the pitman 61 being relieved of momentum and inertia strains in the same manner as the connecting rod 7. With these strains removed, the only appreciable strain now thrown upon the pitman 61 is the working strain of cutting the grass.

As already mentioned, the heaviest strain of cutting the grass occurs near the ends of the strokes, therefore sufficient momentum should be allowed to balance this difference, and only the surplus equalized; and in making the calculation, in addition to the sickle 38, half the weight of the pitman 61 should preferably be taken into account and considered as a reciprocating part.

It is to be noted of my invention that the period of the resilient element, when carrying the reciprocating part as a vibrated load, coincides with the rate at which said part is arbitrarily reciprocated, and that, in an independently reciprocated machine part, my device synchronously equalizes a definite, predetermined and constant amount of momentum and inertia, when said part is arbitrarily independently driven at a predetermined constant speed.

I claim as my invention:—

1. The combination of an isochronally reciprocating part of a machine, a crank-and-pitman connected to said reciprocating part, said reciprocating part adapted to be driven at a certain fixed rate of reciprocation, a stationary part of the machine, and a resilient element connecting the said reciprocating and stationary parts, the point of equilibrium of said element coinciding with the middle point of the stroke of said reciprocating part and the resisting strength of said element being such that when loaded with the said reciprocating part its natural period of vibration is equal to the arbitrary rate of reciprocation independently given to said reciprocating part.

2. The combination of an isochronally reciprocating part of a machine, a crank-and-pitman connected to said reciprocating part, said reciprocating part adapted to be driven at various fixed rates of reciprocation, a stationary part of the machine, a resilient element connecting the said reciprocating and stationary parts, the point of equilibrium of said element coinciding with the middle point of the stroke of said reciprocating part and the resisting strength of said element being such that when loaded with the said reciprocating part its natural period of vibration is equal to the arbitrary rate of reciprocation independently given to said reciprocating part, and means for adjusting said element to vary said natural period to correspond with the different fixed rates of reciprocation.

3. The combination of an isochronally reciprocating part of a machine, a crank-and-pitman connected to said reciprocating part and determining its amplitude of reciprocation, said reciprocating part adapted to be driven at various fixed rates of reciprocation, a stationary part of the machine, a spring connecting the said reciprocating and stationary parts, the point of equilibrium of said spring coinciding with the middle point of the stroke of said reciprocating part and the resisting strength of said spring being such that when loaded with the said reciprocating part its natural period of vibration is equal to the arbitrary rate of reciprocation independently given to said reciprocating part, and means for lengthening and shortening the active portion of said spring, so as to vary said natural period to correspond with the different fixed rates of reciprocation.

4. The combination of an isochronally reciprocating part of a machine, a crank-and-pitman connected to said reciprocating part, a stationary part of the machine, and a resilient element connecting the said reciprocating and stationary parts, the point of equilibrium of said element coinciding with the middle point of the stroke of said reciprocating part and the resisting strength of said element being such that when loaded with some constant divisional portion of the mass of said reciprocating part its natural period of vibration is equal to the arbitrary rate of reciprocation independently given to said reciprocating part.

5. The combination of an isochronally reciprocating part of a machine, a crank-and-pitman connected to said reciprocating part, said reciprocating part adapted to be driven by said crank-and-pitman at various fixed rates of reciprocation, a stationary part of the machine, a resilient element connecting the said reciprocating and stationary parts, the point of equilibrium of said element coinciding with the middle point of the stroke of said reciprocating part and the resisting strength of said element being such that when loaded with some constant divisional portion of the mass of said reciprocating part its natural period of vibration is equal to the arbitrary rate of reciprocation independently given to said reciprocating part, and means for adjusting said element to vary said natural period to correspond with different fixed portions of the mass vibrated and with the different fixed rates of reciprocation.

6. In a machine, the combination of a reciprocating element, a crank-and-pitman connected to said element and adapted to reciprocate the same, a part of the machine stationary with respect to said element, a bar spring rigidly secured to said part at one of its ends and having its other end operatively connected to said element, said spring having its point of equilibrium at the middle point of the stroke of said element and adapted to be brought under tension as movement of said element takes place in either direction from said middle point, and a slide carried by said part and embracing said spring and adapted to be adjusted longitudinally on said spring to lengthen or shorten the active portion thereof.

7. In a machine, the combination of a reciprocating element, a crank-and-pitman connected to said element and adapted to reciprocate the same, a part of the machine stationary with respect to said element, a bar spring rigidly secured to said part at one of its ends and having its other end operatively connected to said element, said spring having its point of equilibrium at the middle point of the stroke of said element and adapted to be brought under tension as movement of said element takes place in either direction from said middle point, and a slide carried by said part and embracing said spring and adapted to be adjusted longitudinally on said spring to lengthen or shorten the active portion thereof, the resisting strength of said spring being such that when loaded with said element its natural period of vibration agrees with the arbitrary rate of reciprocation given to said element by said crank-and-pitman.

8. The combination of a reciprocating machine part, a crank-and-pitman connected to said reciprocating part, a stationary part of the machine, a resilient element connecting the said reciprocating and stationary parts, the point of equilibrium of said element coinciding with the middle point of the stroke of said reciprocating part, the said element being of such strength and having the proper ratio of increase in tension when flexed as to equalize approximately all of the surplus momentum and inertia of said reciprocating part at all points throughout a stroke thereof, and means for adjusting said element to cause it to maintain said relation at various fixed rates of reciprocation of said machine part.

9. The combination of a reciprocating machine part, a crank-and-pitman connected to said reciprocating part, a stationary part of the machine, and a resilient element connecting the said reciprocating and stationary parts, the point of equilibrium of said element coinciding with the middle point of the stroke of said reciprocating part, the said element being of such strength and having the proper ratio of increase in tension when flexed as to equalize approximately all of the surplus momentum and inertia of said reciprocating part at all points throughout a stroke thereof.

10. The combination of an isochronally reciprocating machine part, a crank-and-pitman connected to said reciprocating part, a stationary part of the machine, a resilient element connecting the said reciprocating and stationary parts, the point of equilibrium of said element coinciding with the middle point of the stroke of said reciprocating part and the nature of said element being such as to gradually absorb the entire momentum of said reciprocating part during the last half of each stroke thereof, and during the first half of the following stroke to gradually overcome the inertia of the said reciprocating part, restoring its momentum as momentum in the opposite direction, and means for adjusting said element to cause it to maintain said relation at various fixed rates of reciprocation of said machine part.

11. The combination of an isochronally reciprocating machine part, a crank-and-pitman connected to said reciprocating part, said reciprocating part adapted to be driven at a certain fixed rate of reciprocation, a stationary part of the machine and a resilient element connecting the said reciprocating and stationary parts, the point of equilibrium of said element coinciding with the middle point of the stroke of said reciprocating part and the nature of said element being such as to gradually absorb the entire momentum of said reciprocating part during the last half of each stroke thereof, and during the first half of the following stroke to gradually overcome the inertia of the said reciprocating part, restoring its momentum as momentum in the opposite direction.

12. The combination of an isochronally reciprocating machine element adapted to be driven at a fixed rate of reciprocation by other machine elements, a stationary part of the machine, and a resilient medium connected with said element and with said part and so proportioned relatively to said element as to give it naturally the same period of vibration as that at which it is arbitrarily reciprocated.

13. In a machine, the combination of an isochronally reciprocating element, a stationary part, a resilient medium connected with said element and with said part, and means for adjusting said medium so that when loaded with said element it shall have a natural elastic period of vibration coinciding with a predetermined fixed rate of reciprocation of said element.

14. The combination of an isochronally reciprocating part of a machine, a crank-and-pitman connected to said reciprocating part and determining its amplitude of reciprocation, said reciprocating part adapted to be driven at various fixed rates of reciprocation, a stationary part of the machine, a spring connecting the said reciprocating and stationary parts, the point of equilibrium of said spring coinciding with the middle point of the stroke of said reciprocating part and the resisting strength of said spring being such that when loaded with the said reciprocating part its natural period of vibration is equal to the arbitrary rate of reciprocation independently given to said reciprocating part, and means for varying the natural period of vibration of said spring to correspond with the different fixed rates of reciprocation.

15. The combination of an isochronally reciprocating machine part adapted to be driven at various fixed rates of reciprocation, a stationary part of the machine, a resilient element connecting the said reciprocating and stationary parts, the point of equilibrium of said element coinciding with the middle point of the stroke of said reciprocating part and the resisting strength of said element being such that when loaded with some constant divisional portion of the mass of said reciprocating part its natural period of vibration is equal to the arbitrary rate of reciprocation independently given to said reciprocating part, and means for adjusting said element to vary said natural period to correspond with different fixed portions of the mass vibrated and with the different fixed rates of reciprocation.

16. In a mechanical movement, a slidably mounted reciprocating member, and a springing device connected thereto, said springing device exerting a power tending to continue the reciprocation of said member, and means for adjusting said springing device to vary the speed of the vibrations thereof.

17. In a mechanical movement, a guideway, a weight mounted thereon, means for reciprocating said weight on said guideway, a springing device designed of itself to continue temporarily the reciprocation of said weight, and means for adjusting said springing device to vary the speed of the vibrations thereof.

18. In a mechanical movement, a guideway, a weight mounted on said guideway, means for imparting a reciprocating movement to said weight, a spring having one end connected with the weight, a stationary support secured to the other end of said spring, the end of said spring connected with the weight being adapted to vibrate in the path of the weight, and means for adjusting said spring to vary the natural period of vibrations thereof.

19. In a mechanical movement, a guideway, a weight mounted thereon, means for imparting a reciprocating movement to said weight, a spring having one end connected with said weight, a stationary support secured to the other end of said spring, its end attached to the weight being adapted to vibrate in the path of the weight, and adjustable means for preventing the vibration of a part of the spring farthest from the said weight.

In testimony whereof, I have hereunto subscribed my name this 25th day of August 1900.

WILLIAM ASHLEY KELLY. [L. S.]

Witnesses:
  M. L. LIBBEE,
  Z. E. KELLY.

---

Copies of this patent may be obtained for five cents each, by addressing the "Commissioner of Patents, Washington, D. C."